No. 783,846. PATENTED FEB. 28, 1905.
H. H. SIEVERT.
CLOSET SEAT.
APPLICATION FILED JULY 1, 1904.
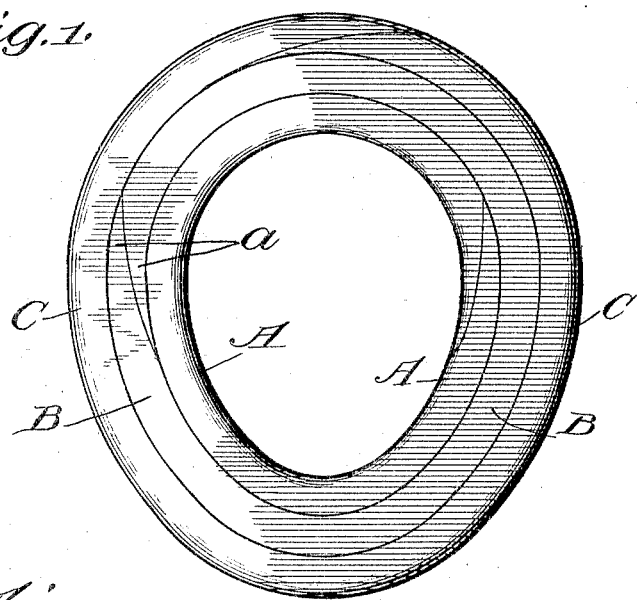
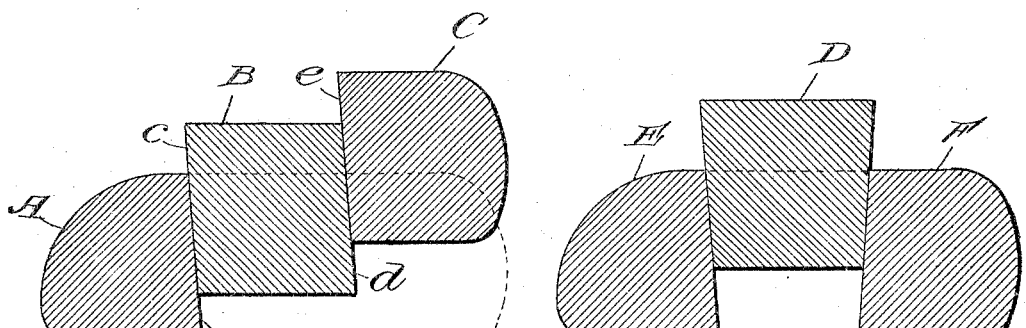
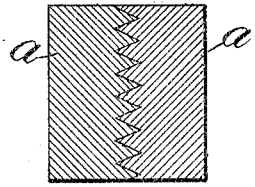
Witnesses:
O. M. Kennick
E. K. Lundy.
Inventor
Henry H. Sievert
By Frank D. Thomason
Attorney.

No. 783,846.

Patented February 28, 1905.

UNITED STATES PATENT OFFICE.

HENRY H. SIEVERT, OF CHICAGO, ILLINOIS.

CLOSET-SEAT.

SPECIFICATION forming part of Letters Patent No. 783,846, dated February 28, 1905.

Application filed July 1, 1904. Serial No. 214,974.

*To all whom it may concern:*

Be it known that I, HENRY H. SIEVERT, a citizen of the United States, and a resident of Chicago, in the county of Cook and State of Illinois, have invented certain new and useful Improvements in Closet-Seats, of which the following is a full, clear, and exact description, reference being had to the accompanying drawings.

My invention relates more particularly to closet-seats, although it obviously can be used for seats of a different character.

The object of my invention is to provide a simply-constructed, strong, durable, and attractive wood seat in which several concentric strips of wood are employed and arranged one within the other in such fashion that each confines and securely retains the strip which it surrounds. This I accomplish by the means hereinafter fully described, and as particularly pointed out in the claims.

In the drawings, Figure 1 is a plan view of my invention. Fig. 2 is a transverse section through a set of rings, showing their relative positions when assembled preparatory to being pressed into proper position, as shown by the dotted lines. Fig. 3 is a similar section showing a modified construction of the rings of said seat. Fig. 4 is a transverse section through the joint made by the overlapping scarfed ends of the same.

As shown in the drawings, my invention comprises a seat composed of two or more rings of wood arranged one within the other. The seat illustrated in the several figures of the drawings comprises three of these rings A, B, and C, each consisting of a single strip of hickory or other suitable wood of such a thickness and width that it can be steamed, bent to conform to the margins of the central opening or parallel thereto, and its scarfed ends lapped and cemented together. I prefer that these scarfed ends $a\,a$ shall be corrugated longitudinally, so that when cemented together and the ring is dried by being placed in a kiln or otherwise the joint will be much stronger, because of the increased area of the cemented contacting surface of its overlapping tapered ends, and the lateral displacement of the same will be avoided. These rings when taken from the kiln are approximately of the elliptical or other shape and have the proper dimensions it is necessary for them to have in the finished seat. The inner edge of the inner ring A is preferably rounded and so likewise is the outer edge of the outer ring C; but the outer edge $b$ of the inner ring is beveled slightly in an inward direction, and the engaging inner edge $c$ of the intermediate ring B is provided with a corresponding undercut bevel, and the outer edge $d$ of said intermediate ring is beveled, preferably, in a plane parallel to that of the opposite inner edge thereof, and the inner engaging edge $e$ of the outer ring C is correspondingly beveled. In assembling these rings to form the seat the engaging edges thereof are coated with cement, and then ring B is set upon and surrounds ring A in the manner and to the extent shown in Fig. 2, and the outer ring C is set upon and surrounds ring B in the same manner. Thus assembled the rings are placed between the rams of a hydraulic or other press and pressed flat, or until rings B and C are in the same horizontal plane, whereupon the rings are clamped in this position until the cement is set, and then the seat is finished in a suitable manner by further rounding its inner and outer edges, (providing this be found necessary,) planing and sandpapering the same, and then varnishing it. In order to build the seat so that any weakness may be eliminated, the joint of the inner ring A, formed by its overlapping edges, is located on one side of the central opening of the seat, the corresponding joint of the intermediate ring is located on the opposite side of the said opening, and the corresponding joint of the outer ring is located at the rear of the seat. Of course these rings could be made so as to break joints at other places than as just stated; but the advantage of locating said joints as indicated is that when fastening the hinge to the rear edge of the seat the screws employed for this purpose may be screwed through the overlapping end of the joint of the outer ring, and thus strengthen the same.

In Fig. 3 I show a slightly-modified construction of my invention, which consists in providing the edges of the intermediate ring D with oppositely-inclined undercut bevels and correspondingly beveling the edges of the inner ring E and the outer ring F engaged thereby. Thus constructed, the three rings of this modified seat are pressed flat into the same horizontal plane by the pressure of a hydraulic or other press, substantially as hereinbefore stated. When thus constructed, the rings composing the seat are securely held together the same as if shrunk one upon the other and produce a seat stronger and more durable than has heretofore been considered possible and at a comparatively less cost.

What I claim as new is—

1. The method of making closet-seats consisting of, first, forming several wooden rings the inner one of which is less in diameter than the outer one; second, applying cement to the engaging edges thereof; third, pressing said rings the one outside of the other, into the same horizontal plane; and fourth, finishing the same.

2. The method of making closet-seats consisting of, first, forming several wooden rings the inner one of which is less in diameter than the outer one and having their engaging edges beveled; second, applying cement to the engaging edges thereof; third, pressing said rings the one outside of the other into the same horizontal plane; and fourth, finishing the same.

3. A closet-seat comprising three continuous wooden rings having their contacting side edges beveled and one surrounded and inclosed between the others and centripetally and centrifugally pressing against each other.

4. A closet-seat comprising three continuous wooden rings each consisting of a single suitably-bent strip of wood having their contacting side edges beveled and one surrounded and inclosed between the others and centripetally and centrifugally pressing against each other.

5. A closet-seat comprising three continuous wooden rings each consisting of a single suitably-bent strip of wood having their contacting side edges beveled and having overlapping reduced ends one surrounded and inclosed between the others and centripetally and centrifugally pressing against each other.

6. A closet-seat comprising three continuous wooden rings each consisting of a single suitably-bent strip of wood having their contacting side edges beveled and their ends overlapping and one surrounded and inclosed between the others and confined and inclosed within the embrace of the same the engaging surfaces of the ends of each ring being provided with a series of longitudinal corrugations.

7. A closet-seat comprising three continuous wooden rings each consisting of a single suitably-bent strip of wood having their contacting side edges correspondingly beveled and having overlapping reduced ends one surrounded and inclosed between the others and centripetally and centrifugally pressing against each other.

In testimony whereof I have hereunto set my hand this 27th day of June, 1904.

HENRY H. SIEVERT.

Witnesses:
 FRANK D. THOMASON,
 E. K. LUNDY.